Oct. 26, 1965  G. M. KELLY  3,213,643
FLEXIBLE COUPLING
Filed Sept. 18, 1963  2 Sheets-Sheet 1
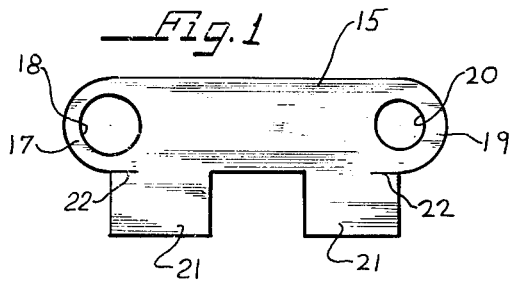
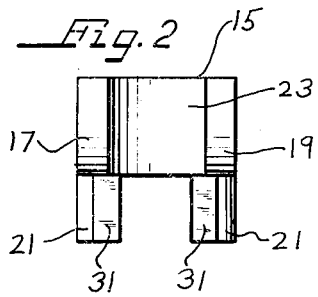
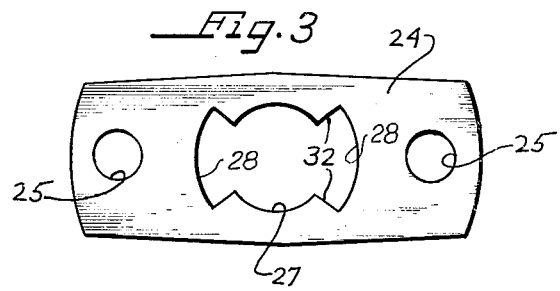
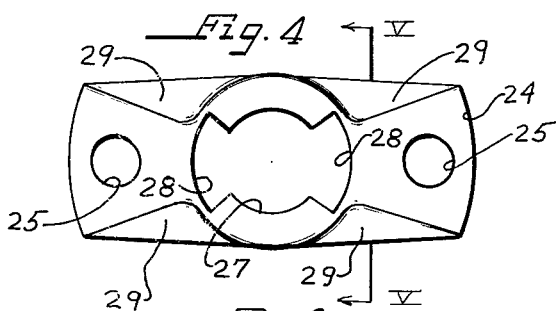
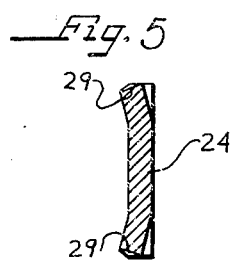
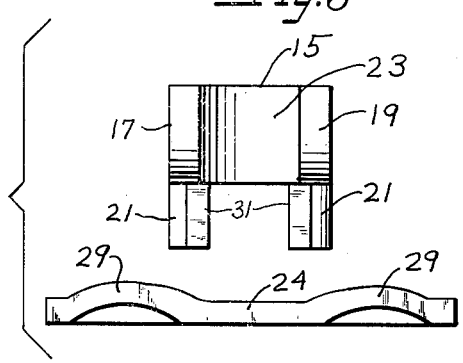
INVENTOR.
George M. Kelly
BY
ATTORNEYS

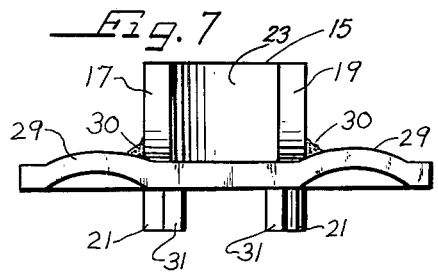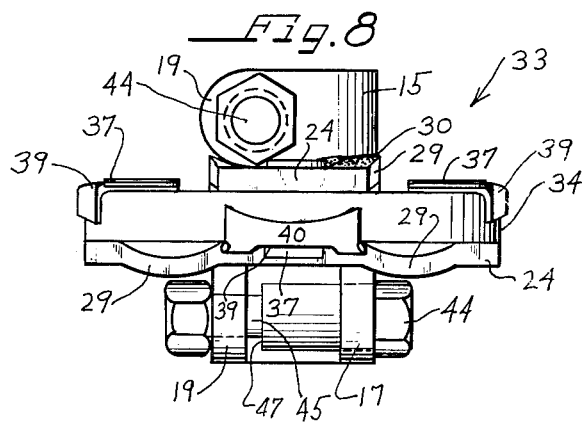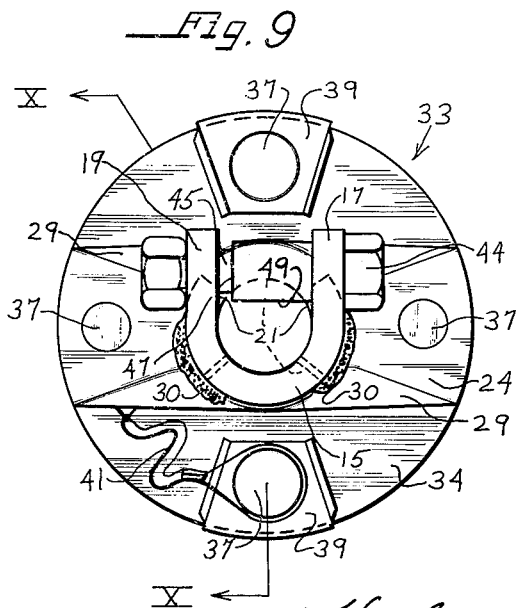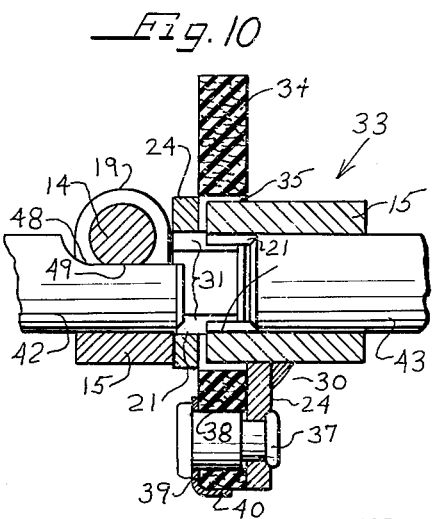

United States Patent Office

3,213,643
Patented Oct. 26, 1965

1

3,213,643
FLEXIBLE COUPLING
George M. Kelly, Grosse Pointe Park, Mich., assignor to Kingston Products Corporation, Kokomo, Ind., a corporation of Indiana
Filed Sept. 18, 1963, Ser. No. 309,812
7 Claims. (Cl. 64—13)

The present invention relates to improvements in flexible couplings and more particularly concerns an improved coupling of this type comprising a resiliently flexible non-metallic disk joining shaft gripping metallic members and a method of making the same.

In couplings of this type, the shaft gripping metallic members have heretofore been constructed as castings or forgings and requiring substantial machining including facing, broaching, and the like.

In contrast, the principal aim of the present invention is to produce a less expensive coupling structure which can be produced at lower cost, utilizing die stamping manufacturing techniques to produce metal parts formerly made by the more expensive casting or forging modes of manufacture.

Another aim of the invention is to produce a new and improved flexible coupling in which the metal parts substantially eliminate machining steps in manufacture.

A further aim and object of the invention is to provide a new and improved coupling device comprising a novel assembly of metal stampings.

Still another object of the invention is to provide a new and improved flexible coupling having novel metal parts of improved strength and ruggedness.

Yet another object of the invention is to provide a novel method of making flexible coupling members.

Other objects, features and advantages of the present invention will be readily apparent from the following detailed description of a preferred embodiment thereof taken in conjunction with the accompanying drawings, in which:

FIGURE 1 is a plan view of a clamp yoke stamping for one part of a shaft connector of a coupling;

FIGURE 2 is an elevational view of the same part after it has been formed up into completed shape;

FIGURE 3 is a plan view of a base plate bar stamping for a component member of the shaft connector assembly;

FIGURE 4 is a plan view of the stamping of FIGURE 3 after it has been completed;

FIGURE 5 is a sectional detail view taken substantially on the line V—V of FIGURE 4;

FIGURE 6 is an exploded assembly view of the parts of FIGURES 2 and 4 showing their orientation for assembly;

FIGURE 7 is an elevational view of the completed assembly of the shaft engaging connector for a flexible coupling;

FIGURE 8 is an elevational view of a flexible coupling embodying two of the connectors of FIGURE 7, and associated elements;

FIGURE 9 is a bottom plan view of the coupling of FIGURE 8; and

FIGURE 10 is a sectional elevational detail view taken substantially on the line X—X of FIGURE 9.

Since an important aspect of the present invention resides in the construction and the method of making the shaft engaging members or assemblies of the coupling, reference will be had first to FIGURES 1 and 2 disclosing steps in the making of a shaft terminal engaging or clamp component 15 providing one of a two part assembly. Desirably, the element 15 is die stamped from suitable heavy gauge metal such as cold rolled steel, in the illustrated instance on the order of one quarter inch thick. As blanked out, the member or element 15 comprises an elongated body having at one end a terminal ear 17 provided with a bolt hole 18 and at its opposite end a similar terminal ear 19 provided with a bolt hole 20 desirably of a slightly smaller diameter than the bolt hole 18. Extending from one side of the body is a pair of preferably identical spaced apart lug flanges 21. Adjacent the terminals 17 and 19, the respective lug flanges 21 are partially separated as by shearing on lines 22. From the flat form, the blanks for the elements 15 are shaped into substantially U-form to define a semi-circular shaft-receiving socket bight 23, with the terminal ears 17 and 19 extending in spaced parallel coextensive relation tangentially from the bight. In this relationship, the bolt holes 18 and 20 are disposed in coaxial relation. Each of the lug flanges 21 is shaped conformable to the cylindrical surface generated in the bight 23 and with the portions of the lugs severed from the adjacent ears 17 and 19 diverging inwardly from the planes of the ears whereby the lug flanges are disposed in directly opposite segmental relation.

A second component or element of the clamp assembly comprises a die stamped base bar 24 which is blanked from suitable heavy gauge sheet metal such as cold rolled steel, but preferably from a slightly lighter gauge than the clamp 15. For example, where the clamp is made from stock of about one quarter inch thickness the base bar 24 may be made from stock of about three sixteenths inch thickness. Adjacent to each opposite end, the elongated bar has punched therethrough a rivet hole 25. Centrally, the bar has punched therethrough an essentially circular opening 27 of a diameter equal to the diameter of the circle included in the yoke bight 23 of the clamp 15.

At diametrically opposite sides of the opening 27 on the longitudinal axis of the base bar 24 is provided a socket recess enlargement 28 complementary to the shape of the cross-sectionally arcuate lug extensions 21 of the clamp.

For reinforcement and flexible coupling disk flexure clearance, the base bar 24 is formed with arched embossments 29 in its longitudinal margins, symmetrically at opposite sides of the rivet holes 25 and adjacent to but spaced from the central opening 27, with flat coplanar areas about the rivet holes and the central opening, substantially as shown in FIGURES 4 and 5.

Assembly of the clamp 15 with the base 24 is effected by orienting the members substantially as shown in FIGURE 6 with the lug flanges 21 of the clamp aligned with the complementary recesses 28. Then, by relative assembly movement, the lugs 21 are inserted into and through the recess 28 as shown in FIGURE 7. This effects a centered relation of the clamp 15 on the base bar 24, with the opening between the ears 17 and 19 directed toward one side of the bar and the bight 23 concentric and aligned with the central opening 27, as best seen in FIGURE 9. In the thus assembled relationship, with the free adjacent edges of the yoke portion of the clamp member seated against the flat surface areas about the central opening 27, a fixed contacting relationship is established between the elements. Axial displacement of the clamp element 15 away from the base bar 24 is prevented by suitable securing means of which a satisfactory device comprises hydrogen brazing or arc welding represented by the attachment bead or fillet 30 securing the clamp yoke to the base bar but leaving the ear flanges 17 and 19 free from direct attachment to the base bar.

Relative torque displacement of the clamp element and the base bar 24 is precluded by the torque interlock afforded by the lug projections 21 fitting in the complementary recesses 28 of the base bar and wherein opposite edge shoulders 31 on the lugs interlockingly oppose respective interlock shoulders 32 defining the circumferential sides of the recesses 28. By virtue of the substantial width of the lugs 21 they afford great shear resistance in their connection with the yoke portion of the clamp 15.

Two of the unitized shaft terminal engaging metal stamping assemblies 15, 24 are employed in each coupling assembly 33 (FIGS. 8–10). To this end, the two shaft engaging units are mounted on opposite faces of a stiffly resiliently flexible coupling disk 34 desirably comprising a suitable elastically bonded fiber or fabric compact or laminate such as a rubber impregnated compactly laminated fabric stack of on the order of three eighths inch thickness in the exemplary coupling assembly depicted. The outside diameter of the disk 34 and the length of the base plate bar 24 in each instance is preferably substantially the same and in the assembly the ends of the base bars are in this instance coincident with the perimeter of the disk.

Centrally the disk 34 has an opening 35 which is desirably of a slightly greater diameter than the diameter about the clamping element projection lugs 21 and which lugs are of a length to extend substantially beyond the disk-engaging face of the respective base bar 24 and into the disk opening 35 but preferably shorter in the projecting portion than the thickness of the disk, substantially as seen in FIGURE 10. In the assembly, the clamp yokes 15 are substantially concentrically aligned with one another and with the central hole 35 of the disk, with the respective sets of interlock lug projections 21 complementally intermeshingly telescoped and with the respective side edges 31 in opposing relation. As best viewed in FIGURE 9, by having the lugs 21 of slightly less width than the full segment of the occupied assembly circle, and by having the opposing edges 31 in spaced relation limited relative torsional and rocking movements of the metal connector units are permitted while nevertheless a limit upon relative torque movements of the metal shaft connector units is imposed. Thus, a limited lost motion torque displacement is permitted with torque interlocking of the lugs 21 at the ends of the lost motion limits.

Attachment of the base bars 24 to the coupling disk 34 at substantially right angles to one another is effected by suitable means such as respective heavy duty rivets 37 extending through the rivet holes 25 in the end portions of the base bars and through aligned rivet holes 38 provided in the disk. In each instance, on the opposite face of the disk from the attached end portion of the respective base bar, a suitable stamped washer 39 is engaged under the head of the rivet, with a stabilizing flange 40 of the washer engaging the adjacent perimeter of the coupling disk 34. For grounding or other electrical purposes an electrical connection 41 may be secured between the base bars through adjacent attaching rivets 37 as shown in FIGURE 9.

Aligned shaft terminals 42 and 43 (FIG. 10) are adapted to be engaged within the clamps 15 and clamped therein by drawing the ears 17 and 19 toward one another by means of respective securing bolts 44 extending through the larger diameter bolt hole 18 of the ear 17 and each bolt having a reduced diameter terminal portion 45 extending through the smaller diameter bolt hole 20 of the ear 19, with a shoulder 47 at the juncture of the smaller and larger diameter portions of the bolt shank opposing the inner face of the clamping ear 19 to serve as a stop to avoid overtightening of the clamping ears beyond their elastic limit and thus avoid the ears taking a set which would render difficult a desirable detachment and release of the coupled shaft terminal.

In order to avoid any necessity for machining of splines or other types of keying structure in the bight portions of the clamping yokes of the clamps 15, in order to hold the shaft terminals 42 and 43 corotative with the coupling 33, the bolt 44 in each instance is mounted to intersect the associated shaft terminal chordally and for which purpose the respective terminal portions of the shafts 42 and 43 are provided with chordal recesses or flats 48 with which the clamping bolt shanks are engageable. Distribution of torque load over a larger surface area of the associated bolt shank is afforded by providing the bolt shank with a matching chordal flat surface 49. This also facilitates tightening of the clamping bolt by holding it against turning while its nut is being drawn up to tighten the clamp ears 17 and 19 for gripping the shaft terminal in the clamp. Furthermore, as the clamp ears are sprung toward one another the bolt is moved slightly inwardly toward the engaged shaft terminal to improve the firm grip of the shaft terminal in the clamp to resist relative axial displacement of the shaft and clamp.

It will be understood that modifications and variations may be effected without departing from the scope of the novel concepts of the present invention.

I claim as my invention:

1. A flexible coupling assembly comprising in combination,
 a resiliently flexible coupling disk,
 and a pair of shaft terminal engaging units one of which is secured to each opposite face of the disk,
 each of said units comprising a base bar member and a clamp member,
 means on the clamp member for clampingly securing it to a shaft terminal,
 one of said members having a recess therein,
 the other of said members having an interlock projection engaging in the recess and thereby retaining the members against relative torque displacement,
 and means in addition to said interlock projection and said means on the clamp member and securing the members against separation.

2. A flexible coupling comprising a resiliently flexible disk having secured to respectively opposite faces thereof shaft terminal securing coupling units,
 each of said units including an elongated base bar and a shaft receiving clamp,
 said base bars and said disk having coaxially aligned openings therethrough,
 said clamps being seated on and secured to the base bars aligned with said openings,
 and said clamps having torque interlock projections extending through the respective openings in the base bars and into the opening in the disk and being relatively telescopically intermeshingly related to one another to resist torque displacement of the clamps relative to one another.

3. A flexible coupling comprising a resiliently flexible disk having secured to respectively opposite faces thereof shaft terminal securing coupling units,
 each of said units including an elongated base bar and a shaft receiving clamp,
 said base bars and said disk having coaxially aligned openings therethrough,
 said clamps being seated on and secured to the base bars aligned with said openings,
 and said clamps having torque interlock projections extending through the respective openings in the base bars and into the opening in the disk and being relatively telescopically intermeshingly related to one another to resist torque displacement of the clamps relative to one another,
 said projections and said base bars having opposing interlock shoulders retaining the respective clamps and base bars against relative torque displacement.

4. In a coupling structure,
 a base plate member of predetermined thickness,
 a clamping yoke member seated edgewise on one side of the base plate member,
 an interlock lug substantially longer than said predetermined thickness projecting from the seating edge of the clamping yoke member,
 the base plate member having a socket hole therethrough in which the lug is interlockingly engaged and projects substantially beyond the opposite side of the plate member, and means securing the clamping yoke member to the base plate member and with said lug in said projecting relation beyond the opposite side of the plate member whereby to enable telescopic intermeshing with a like lug of a similar coupling structure in a flexible coupling assembly.

5. A coupling unit comprising a heavy gauge base plate stamping of predetermined thickness,
a heavy gauge socket yoke stamping having interlock lugs of substantially greater length than said predetermined thickness projecting from one edge,
said base plate having opening therethrough providing socket recesses receptive of said lugs,
said yoke being engaged on said edge against one face of the base plate with said lugs extending through said opening and substantially beyond the opposite face of the base plate and engaging in said socket recesses and thereby retaining the base plate and the socket yoke against relative torque displacement,
and means securing the yoke and base plate against separation and with said lugs in said extending relation beyond said opposite face whereby to enable telescopic intermeshing with like lugs of a similar coupling unit in a flexible coupling assembly.

6. A coupling unit comprising a heavy gauge base plate stamping of predetermined thickness,
a heavy gauge socket yoke stamping having interlock lugs of substantially greater length than said predetermined thickness projecting from one edge,
said base plate having opening therethrough providing socket recesses receptive of said lugs,
said yoke being engaged on said edge against one face of the base plate with said lugs extending through said opening and substantially beyond the opposite face of the base plate and engaging in said socket recesses and thereby retaining the base plate and the socket yoke against relative torque displacement,
and means securing the yoke and base plate against separation and with said lugs in said extending relation beyond said opposite face whereby to enable telescopic intermeshing with like lugs of a similar coupling unit in a flexible coupling assembly,
said base plate having portions thereof projecting laterally substantially beyond the yoke and having arched reinforcement offsets therein.

7. A shaft connector for a flexible coupling comprising,
a base bar,
a separately formed clamping yoke having an edge seated on and secured to said base bar,
said yoke having interlock lug means projecting from said edge,
and said base bar having a complementary recess therein into which said lug means extend,
and interlock shoulders on said lug means and on said base bar in said recess and said shoulders interlockingly engaging and precluding relative torque displacement of the yoke and base bar.

References Cited by the Examiner

UNITED STATES PATENTS

| | | | |
|---|---|---|---|
| 1,197,333 | 9/16 | Benner | 287—133 |
| 1,541,520 | 6/25 | Macdonald | 64—13 |
| 1,748,486 | 2/30 | Lord | 64—17 |
| 2,267,904 | 12/41 | Evans | 64—14 |
| 2,561,830 | 7/51 | Vanderzee | 64—13 |
| 2,632,317 | 3/53 | Denault | 64—13 |
| 2,753,702 | 7/56 | Dunn | 64—13 |
| 2,759,364 | 8/56 | Lewis | 287—20.5 |
| 2,797,562 | 7/57 | Forgash | 64—11 |
| 3,045,455 | 7/62 | Potgieter | 64—17 |
| 3,046,759 | 7/62 | Deford et al. | 64—27 |

FOREIGN PATENTS

| | | |
|---|---|---|
| 110,083 | 3/40 | Australia. |

BROUGHTON G. DURHAM, *Primary Examiner.*
ROBERT C. RIORDON, *Examiner.*